United States Patent
Symons et al.

(10) Patent No.: US 7,921,410 B1
(45) Date of Patent: Apr. 5, 2011

(54) ANALYZING AND APPLICATION OR SERVICE LATENCY

(75) Inventors: Julie A. Symons, Santa Clara, CA (US); Ira Cohen, Sunnyvale, CA (US); Gerald T. Wade, Auburn, CA (US); John M. Green, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1030 days.

(21) Appl. No.: 11/784,611

(22) Filed: Apr. 9, 2007

(51) Int. Cl.
*G06F 9/44* (2006.01)
(52) U.S. Cl. ........................................... 717/124
(58) Field of Classification Search .............. 717/124
See application file for complete search history.

(56) References Cited

U.S. PATENT DOCUMENTS

| | | | | |
|---|---|---|---|---|
| 5,872,976 | A * | 2/1999 | Yee et al. | 717/127 |
| 6,061,722 | A * | 5/2000 | Lipa et al. | 709/224 |
| 6,374,371 | B1 * | 4/2002 | Lee | 714/42 |
| 2002/0120727 | A1 * | 8/2002 | Curley et al. | 709/223 |
| 2003/0023716 | A1 * | 1/2003 | Loyd | 709/224 |
| 2003/0056200 | A1 * | 3/2003 | Li et al. | 717/128 |

OTHER PUBLICATIONS

Sujata Benerjee et al., "Network Latency Optimizations in Distributed Database Systems", Feb. 1998.*
Myung-Sup Kim et al., "A Flow-based Method for Abnormal Network Traffic Detection", Apr. 2004.*

* cited by examiner

*Primary Examiner* — Wei Y Zhen
*Assistant Examiner* — Lanny Ung

(57) ABSTRACT

A method for analyzing a latency of a transaction performance is provided. The method includes receiving first transaction latency data which includes a transaction latency of a transaction and a first plurality of latency components that contribute to the transaction latency, receiving a definition of normality for the transaction latency, determining whether the transaction latency is normal or abnormal based at least on the definition of normality, upon the determining that the transaction latency is abnormal, determining whether there is a sufficient amount of the first transaction latency data based on a predefined criterion, upon the determining that the amount of the first transaction latency data is sufficient, computing a normal latency for each of the first plurality of latency components; and ranking the first plurality of latency components based on a degree of abnormality of each of the first plurality of latency components, which is based on the computed normal latency for the each latency component.

20 Claims, 3 Drawing Sheets

ANALYZING AND APPLICATION OR SERVICE LATENCY

BACKGROUND

Monitoring transaction or job latency is one measure for determining the health of an application or service tasked with performing the transaction (or job). As referred herein, latency is a time delay between the moment a task is initiated and the moment the same task is completed. The task may be a transaction, a job, or a component of such a transaction or job. Thus, for example, a transaction latency is response time of the transaction, i.e., the time delay between the moment the transaction is initiated by an application (or service) and the moment such a transaction is completed by the application (or service). Once longer than normal latency is observed of a transaction, there is a desire to isolate the cause or primary component that is contributing to the longer latency in order to rectify the problem. However, the typical methods of looking at single measures of normal and abnormal latencies makes it difficult to accurately assess the problem because such measures are not deterministic and are affected by noise and other external influences.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems for determining the health or status of an information technology (IT) application or service by monitoring transaction or job latencies of the application (or service), determining normal-latency behaviors of components in the transaction latencies, and identifying those components that contribute most to instances when the transaction latencies are deemed abnormal or unhealthy. The methods and systems as described herein are also operable to monitor a transaction or job latency of an IT application (or service), statistically characterizing normal latencies of components of the transaction latency, automatically recognizing or identifying statistically significant changes in the component latencies, and adapting to changes in such normal-latency behaviors over time. As referred herein, and as understood in the art, information technology, or IT, encompasses all forms of technology, including but not limited to the design, development, installation, and implementation of hardware and software information or computing systems and software applications, used to create, store, exchange and utilize information in its various forms including but not limited to business data, conversations, still images, motion pictures and multimedia presentations technology and with the design, development, installation, and implementation of information systems and applications. IT distributed environments may be employed, for example, by Internet Service Providers (ISP), web merchants, and web search engines to provide IT applications and services to users.

System

Figure 1:
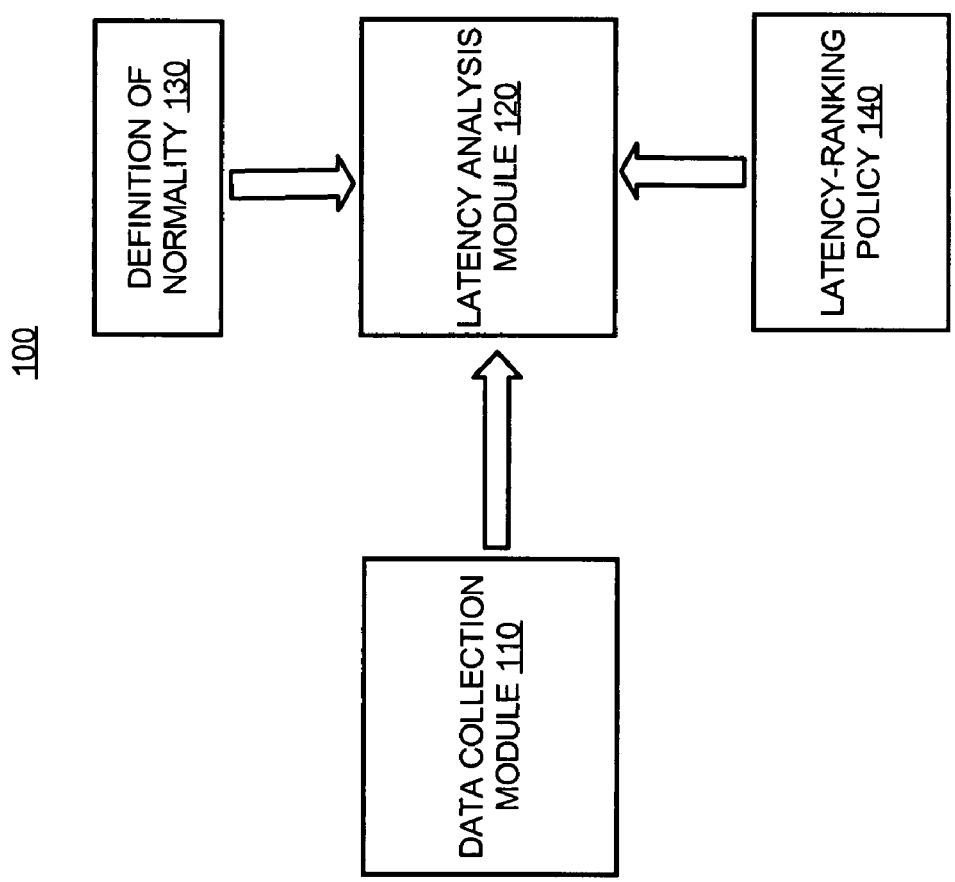
FIG. 1 illustrates a block diagram system wherein one or more embodiments may be practiced.

FIG. 1 illustrates a block diagram of a system 100 for monitoring and analyzing transaction or job latencies of an IT application or service, wherein an embodiment may be practiced. For simplification purposes, various embodiments are discussed herein with reference to an application and a transaction performed by such an application. However, it should be understood that any discussion regarding an application is also applicable to a service, and any discussion regarding a transaction is also applicable to a job or any other tasks performed by an application or service. The system 100 is operable to automatically induce a model of normality for a transaction latency, automatically produce a ranked list of components for abnormal occurrences, based on the degree of abnormality of each component, and automatically adapt to changes in the normality model. The system 100 may be separate from or incorporated into the distributed system(s) that it monitors.

The system 100 includes a data collection module 110 and a latency analysis module 120. In one embodiment, one or more data collectors are employed for the data collection module 110. A data collector is one or more software programs, software applications or software modules. As referred herein, a software program, application, or module includes one or more machine-coded routines, objects, components, data structures, and the like that perform particular tasks or implement particular abstract data types. The data collector is used to monitor and measure the latency of transactions or jobs that are submitted to an IT application or service as implemented in a distributed system, such as an IT data center or an IT network system. Thus, it monitors the distributed system (not shown) to obtain the latency metrics (data measurements), which includes latency metrics of individual components that contribute to the total latency of a transaction or job. For example, the data collector is operable to measure total response time of a transaction and also break down the total response time into the following components: network time, connection time, server time, and transfer time that correspond to the transaction components. Each of the components may include measurable sub-components. For example, server time is made up of time spent in the web server, time spent in the application server, and time spent in the database server. Examples of possible data collectors include but are not limited to: HP Asset and OpenView softwares from Hewlett Packard Company of Palo Alto, Calif., BMC Discovery Express from BMC Software, Inc. of Houston, Tex.; and those data collectors available in the VMware CapacityPlanner software and CDAT software from IBM Corporation of Amonk, N.Y.

In one embodiment, the latency analysis module 120 is also one or more software programs, software applications or software modules. It is operable through automation to statistically characterize normal component latencies of transactions or jobs that are performed by an application/service in a distributed system, to adapt to changes in such characterized normal behavior over time, and to recognize statistically significant changes in component latencies. To that extent, the latency analysis module 120 is operable to receive or provide a definition of normality 130 for latency of some unit of work, such as a transaction or job. It is also operable to receive or provide a normality detection policy 140 for: a) characterizing the normal and abnormal latency for each component of the unit of work, in light of the definition of normality; and b) ranking the work components by their degree of abnormality by comparing the latency measures of each component during an abnormal instance to the latency measures of the same component during times of characterized normal latency.

Figure 2:
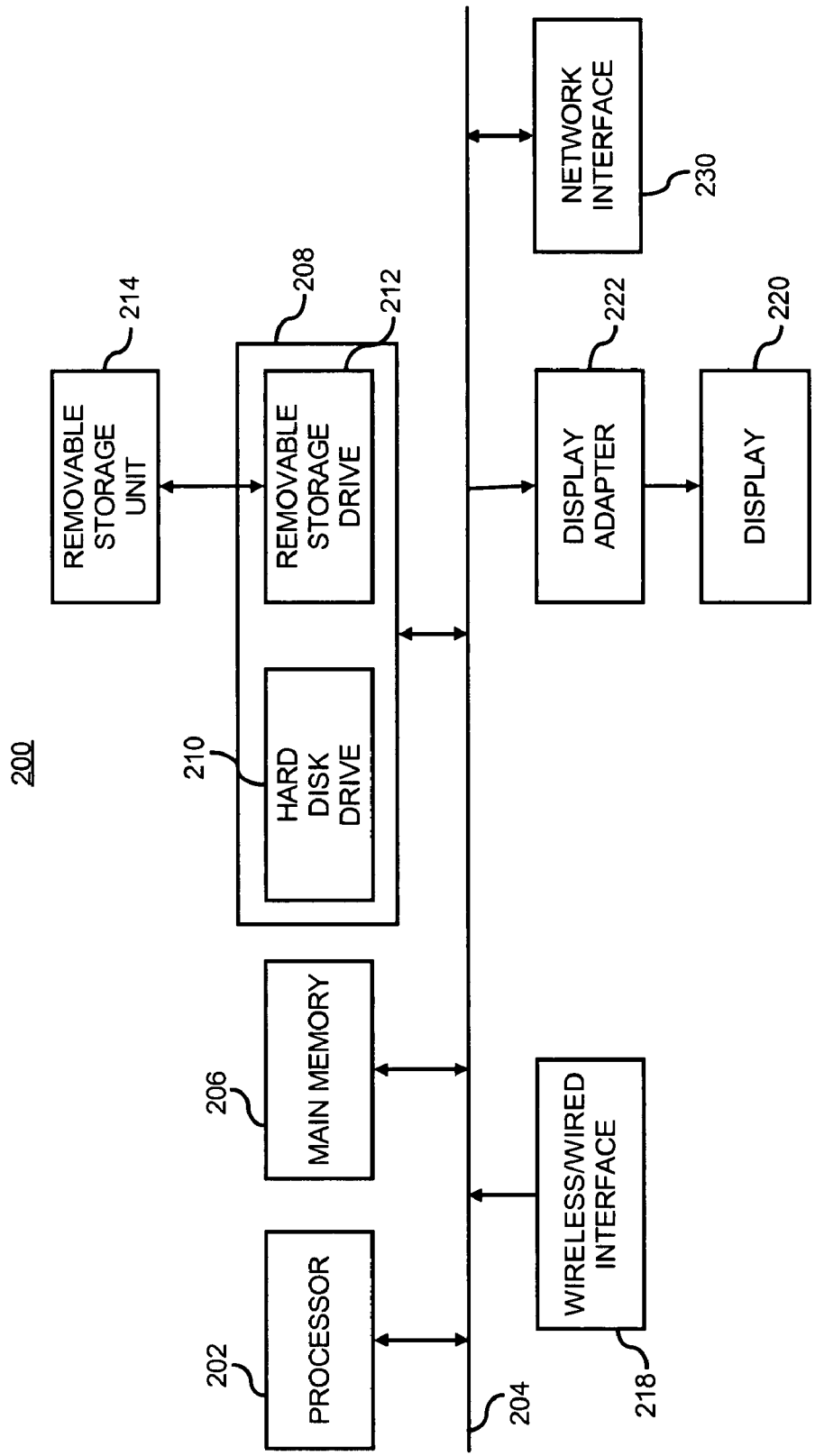
FIG. 2 illustrates a block diagram of a computerized system wherein one or more system components may be practiced, in accordance with one embodiment.

FIG. 2 illustrates a block diagram of a computerized system 200 that is operable to be used as a platform for implementing the system 100, or any one of the modules 110 and 120 therein. The computer system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

Figure 3:
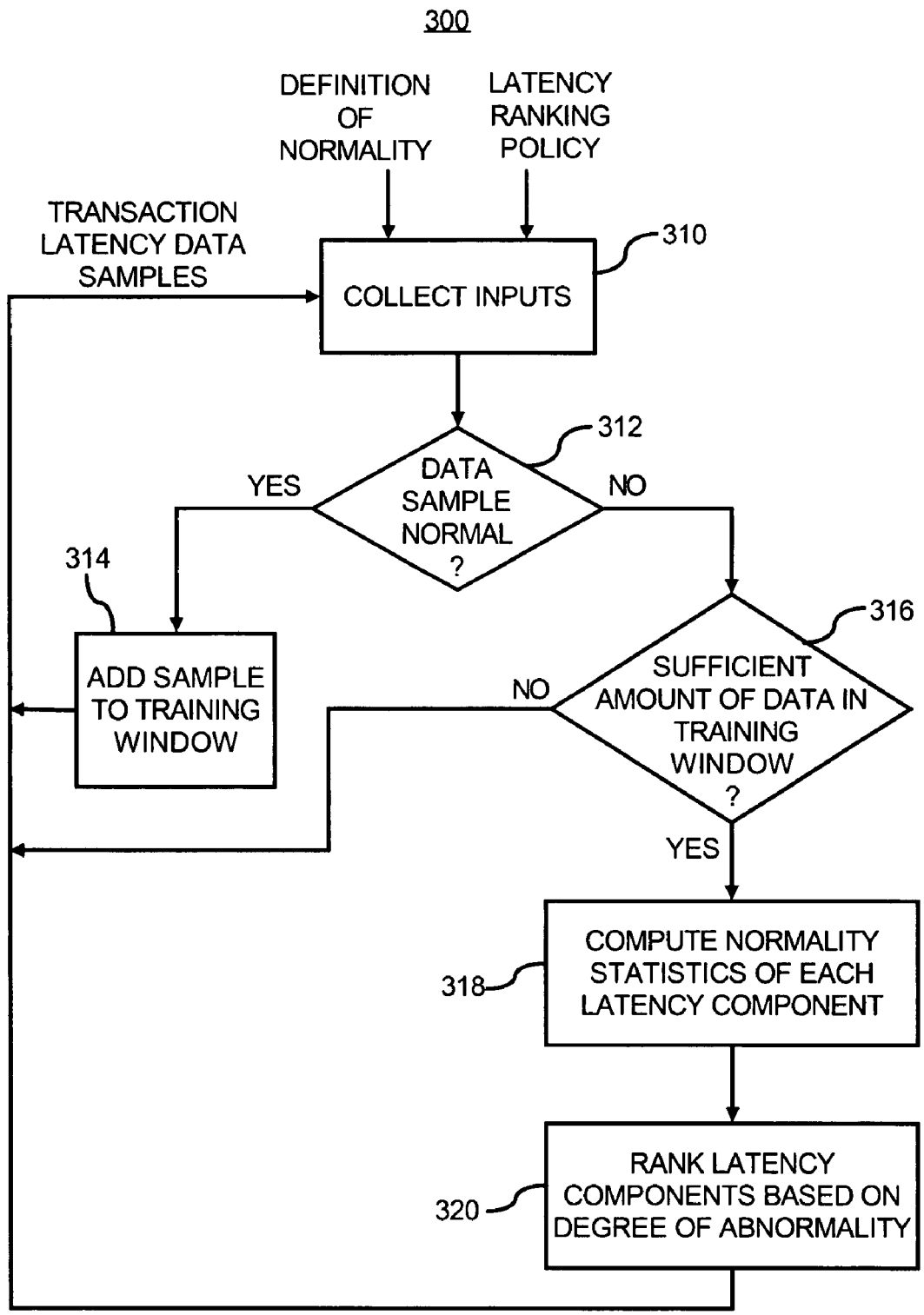
FIG. 3 illustrates a method for monitoring and analyzing a transaction latency, in accordance with one embodiment.

The computer system 200 also includes a main memory 206 where software is resident during runtime, and a secondary memory 208. The secondary memory 208 may also be a computer-readable medium (CRM) that may be used to store software programs, applications, or modules that implement the modules 110 and 120 (FIG. 1) and the method 300 (FIG. 3, as described below). The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Process

FIG. 3 illustrates a flow chart diagram of a method 300 for monitoring and analyzing a latency, or response time, of an IT application transaction, in accordance with one embodiment. For illustrative purposes only and not to be limiting thereof, the method 300 is discussed in the context of the system 100 illustrated in FIG. 1.

At 310, inputs are collected for the latency monitoring and analysis, the inputs collected include monitored latency data of a transaction of interest as performed by an application in a distributed system, a definition of normality for the transaction latency, and a latency-ranking policy or rule. Each of these inputs is described below.

In one embodiment, the data collection module 110 is employed to monitor and collect the transaction latency data. The collection of the transaction latency data includes a plurality of samples or traces, each collected over a predetermined or predefined timer interval (e.g., 5-minute intervals) for a given transaction and is represented by $\{T_n: L_1, c_1, c_2, c_3, \ldots, c_n\}$, where $T_n$ denotes each particular time interval n, $L_1$ denotes the collected transaction latency at time $T_n$, and $c_1 \ldots c_n$ denote the latency components of interest that contribute to the transaction latency $L_1$ at time $T_n$. For example, the latency of a transaction as performed by an application in a distributed system is caused by at least a network time ($c_1$), a connection time ($c_2$), a server time ($c_3$), and a transfer time ($c_4$). The network time indicates the accumulated time for data to traverse throughout the network of the distributed system in the performance of the transaction by the application. The connection time indicates the accumulated time for the application to complete connections (e.g., handshaking protocols) to various hardware elements (e.g., servers, databases) in the distributed system in order to perform and complete the transaction. The server time indicates the accumulated time for the various hardware elements in the distributed system to perform respective tasks as assigned by the application. The transfer time indicates the time it takes for data to be transferred to the source of the transaction request as a result of the processing of the transaction. Embodiments are contemplated wherein the data collected in each sample or trace for each latency component includes a measurement that is collected once per each predefined time interval, an average of multiple measurements collected per each predefined time interval, or any other suitable statistics about the measurement for each latency component per each predefined time interval. Also, it should be understood that the transaction latency $L_1$ may include other latency components, and each latency component may include contributing subcomponents therein. The latency analysis module 120 then receives the collected transaction latency data from the data collection module 110.

The definition of normality for the transaction latency is a predefined definition received by the latency analysis module 120. In one embodiment, this definition provides a threshold value for determining whether each received transaction latency is considered normal. For example, the definition of normality provides a threshold value of 2 seconds, wherein a latency or response time of less than 2 seconds for a given transaction is considered normal and greater than or equal to 2 seconds is considered abnormal or problematic. The definition of normality may be user defined and user input to the latency analysis module 120. However, alternative embodiments are contemplated wherein the definition of normality for the transaction latency is provided to the latency analysis module 120 based on other techniques, such as based on historical data of the distributed system. As referred herein, a user is any entity, human or otherwise, that is authorized to access the system 100, operate the system 100, modify the system 100, or perform any combination thereof. An example of a human user is a system operator or administrator. An example of an automated user is a hardware or software module operable to collect historical data of the distributed system performing the given transaction and calculate the definition of normality.

The latency-ranking policy is a predefined policy received by the latency analysis module 120. In one embodiment, this policy provides instructions on how to rank the latency components of each abnormal transaction latency based on their degree of abnormality. Examples of a latency-ranking policy include standard deviations from the mean (or norm) of each latency component, actual or relative distance from the mean, percentage change from the mean, etc.

Referring back to FIG. 3, the method 300 continues at 312, wherein the latency analysis module 120 determines whether the collected transaction latency data is normal or abnormal based on the predefined definition of normality. This determination is made for each collected sample of the transaction latency data.

At 314, if a data sample is determined to be normal, it is added to a training window.

At 316, however, if a data sample is determined to be abnormal, the latency analysis module 120 proceeds to determine whether there is a sufficient amount of training data (e.g., number of data samples) in the training window to compute statistics about the normality of the latency components in the latency transaction data. Thus, testing for sufficient amount of training data may be delayed until there is abnormal latency data to analyze. The sufficiency of the training window may be empirically set by a user based on one or more desired criteria, such as whether the training data in the training window is consistent for normal behavior patterns of each latency component of interest or whether there is enough training data for generating a normal distribution for each latency component. For example, a training window having 100 samples of transaction latency data collected over 100 time intervals is deemed sufficient for a statistical computation about the normality of the latency components. If there is not sufficient training data in the training window, the method 300 is repeated again at 310 to continue collecting additional samples of the transaction latency data until there is sufficient training data in the training window as determined at 316.

At 318, once there is sufficient training data in the training window, the latency analysis module 120 proceeds to statistically compute a normal latency for each latency component of interest in the latency transaction data. In one embodiment, this is achieved by computing a normal distribution of each latency component based on the received data samples in the training window and the mean value and standard deviation value in the normal distribution. The range of normal latency values for each latency component is then based on the mean and standard deviation values of the normal distribution of such a component as desired. For example, in a standard normal distribution, 68% of the values lie within one standard deviation of the mean, 95% within two standard deviations, and 99% within three (3) standard deviations. Thus, a latency component is considered normal if its value ranges within one, two, or three standard deviations as desired. Alternative embodiments are contemplated wherein the range of normal latency values for each latency component is based on any other desired statistics about the normal distribution of the latency component, such as percentiles of the normal distribution, or about any other desired variable, such as time, that is associated with the latency component.

At 320, once the normal latency of each latency component of interest is statistically computed, the data sample collected and determined to be abnormal at 312 is then compared against these statistical computations to rank the latency components in the new data sample based on their degree of abnormality in accordance with the latency-ranking policy collected at 310. It should be noted that the latency components in an abnormal data sample collected for analysis are of the same respective types as those latency components in the data samples of the training window in order to perform the comparison. The degree of abnormality may be set as desired by the user, as based on the latency-ranking policy, and depends on the amount or percent of difference (increase or decrease) from its normal latency calculated at 318. For example, for a latency-ranking policy based on standard deviations from the mean, if a first latency component has a value in the collected abnormal data sample that is within three standard deviations of the mean and a second latency component has a value in the collected abnormal data sample that is within two standard deviations of the mean, the first latency component is ranked at a higher abnormality level than the first latency component. Thus, the first latency component is deemed to be a bigger contributing factor to the overall abnormal latency transaction sample than the second latency component.

In one embodiment, the latency analysis module 120 continuously executes the method 300 to receive transaction latency data samples and provide a moving training window at 314 as new data samples are collected and received. Referring back to the example wherein there are 100 data samples in the training window, the latency analysis module 120 (e.g., as specified by the user) may discard the oldest five, or any desired number, normal samples in the training windows to make room for five new normal data samples, wherein the normal latency for each latency component of interest is computed again at 318 so that up-to-date ranking of the latency components is continuously performed for better accuracy of the latency analysis.

In an alternative method to the method 300, the collected inputs at 310 do not include the definition of normality. Instead, each transaction latency data sample includes an indication as to whether it is normal or abnormal based on a determination external to the system 100. Thus, in the alternative method, the determination of whether each data sample is normal at 312 is merely based on whether such a data sample carry a normal or abnormal indication, and the alternative embodiment proceeds in accordance to the remainder of the method 300.

Accordingly, the methods and systems as described herein are operable to provide automated analysis of transaction or job latencies and specifically pinpoint problematic latency components in each transaction latency, based on the aforementioned component ranking, so that corrective actions may be performed in the monitored distributed system to rectify the problems in the pinpointed latency components.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for analyzing a latency of a transaction performance, comprising:
   receiving first transaction latency data which includes a transaction latency of a transaction and a first plurality of latency components that contribute to the transaction latency;
   receiving a definition of normality for the transaction latency;
   determining whether the transaction latency is normal or abnormal based at least on the definition of normality;
   upon the determining that the transaction latency is abnormal, determining whether there is a sufficient amount of the first transaction latency data based on a predefined criterion;

upon the determining that the amount of the first transaction latency data is sufficient, computing a normal latency for each of the first plurality of latency components; and ranking the first plurality of latency components based on a degree of abnormality of each of the first plurality of latency components, which is based on the computed normal latency for the each latency component.

2. The method of claim 1, further comprising:
receiving a policy for ranking the first plurality of latency components based on the degree of abnormality.

3. The method of claim 2, wherein ranking the first plurality of latency components comprises:
ranking the first plurality of latency components based on the policy for ranking.

4. The method of claim 1, wherein receiving the first transaction latency data comprises:
receiving a plurality of transaction latency data samples for a plurality of predefined time intervals, each sample includes therein the transaction latency and the first plurality of latency components monitored at each predefined time interval.

5. The method of claim 1, wherein receiving the definition of normality includes:
receiving a predefined threshold for determining a normality of the transaction latency data.

6. The method of claim 1, wherein receiving the policy for ranking the first plurality of latency components based on the degree of abnormality comprises:
receiving an instruction to rank each of the first plurality of latency components based on an amount of deviation of the each latency component from the computed normal latency of the each latency component.

7. The method of claim 1, wherein determining whether there is a sufficient amount of the transaction latency data comprises:
determining whether the first transaction latency data is sufficient for computing a normal latency for the at least one latency component therein as the predefined criterion.

8. The method of claim 4, wherein determining whether the transaction latency is normal or abnormal includes determining whether the transaction latency of each of the plurality of transaction latency data samples is normal or abnormal; and the method further comprises:
upon the determining that the transaction latency of one of the plurality of transaction latency data samples is normal, adding the one transaction latency data sample to a training window for the determining of whether there is a sufficient amount of the first transaction latency data.

9. The method of claim 1, wherein computing the normal latency for each of the first plurality of latency components comprises:
computing the normal latency based at least on a mean value of a normal distribution for each of the first plurality of latency components.

10. The method of claim 1, further comprising:
determining how much contribution of each of the first plurality of latency components to the abnormal transaction latency of the second transaction latency data based on the ranking.

11. A method for analyzing a latency of a transaction performance, comprising:
receiving first transaction latency data which includes:
a) a transaction latency of a transaction;
b) a first indication that the transaction latency is normal or abnormal; and c) a first plurality of latency components that contribute to the transaction latency;

determining whether the transaction latency is normal or abnormal based on the first indication in the first transaction latency data;

upon the determining that the transaction latency is abnormal, determining whether there is a sufficient amount of the transaction latency data in a training window;

upon the determining that the amount of the transaction latency data is sufficient in the training window, computing a normal latency for each of the first plurality of latency components based on the data in the training window; and ranking the first plurality of latency components based on a degree of abnormality of each of the first plurality of latency components, which is based on the computed normal latency for the each latency component.

12. The method of claim 11, wherein receiving the first transaction latency data comprises:
receiving a first plurality of transaction latency data samples, each monitored at a predefined time interval and includes therein the transaction latency and the first plurality of latency components monitored at the predefined time interval.

13. The method of claim 12, wherein determining whether the transaction latency is normal comprises:
determining whether each of the first plurality of transaction latency data samples is normal based on the first indication in the each of the first plurality of transaction data samples.

14. The method of claim 13, wherein determining whether there is a sufficient amount of the first transaction latency data in a training window comprises:
determining whether there is a sufficient number of samples in the first plurality of transaction latency data samples that have therein the first indication of normal.

15. The method of claim 14, further comprising:
moving the training window by replacing a predetermined number of oldest data samples therein with a corresponding number of new data samples received subsequent to the receiving the first transaction latency data.

16. The method of claim 15, wherein computing a normal latency for each of the first plurality of latency components comprises:
computing a normal latency for each of the first plurality of latency components based on the data in the moving training window.

17. The method of claim 16, wherein the degree of abnormality of one of the second plurality of latency components is further based on a value of the latency component in reference to a computed normal latency of the one latency component as based on a latency-ranking policy.

18. The method of claim 17, wherein the first transaction latency data further includes at least one latency sub-component of one of the first plurality of latency components, the at least one latency sub-component contributes to the latency of both the one latency component and the transaction latency in the first transaction latency data.

19. A computer readable medium on which is encoded computer-executable programming code that includes computer execution instructions to:
receive first transaction latency data which includes a transaction latency of a transaction and a first plurality of latency components that contribute to the transaction latency;

receive a definition of normality for the transaction latency;
determine whether the transaction latency is normal or abnormal based at least on the definition of normality;
determine whether there is a sufficient amount of the first transaction latency data based on a predefined criterion upon the determining that the transaction latency is abnormal;
compute a normal latency for each of the first plurality of latency components upon the determining that the amount of the first transaction latency data is sufficient; and
rank the first plurality of latency components based on a degree of abnormality of each of the first plurality of latency components, which is based on the computed normal latency for the each latency component.

20. The computer-readable medium of claim 19, wherein the computer execution instructions to receive the first transaction latency data include:
computer-execution instructions to receive a plurality of transaction latency data samples for a plurality of predefined time intervals, each sample includes therein the transaction latency and the first plurality of latency components monitored at each predefined time interval.

* * * * *

UNITED STATES PATENT AND TRADEMARK OFFICE
CERTIFICATE OF CORRECTION

| | | |
|---|---|---|
| PATENT NO. | : 7,921,410 B1 | Page 1 of 1 |
| APPLICATION NO. | : 11/784611 | |
| DATED | : April 5, 2011 | |
| INVENTOR(S) | : Julie A. Symons et al. | |

It is certified that error appears in the above-identified patent and that said Letters Patent is hereby corrected as shown below:

On the face page, in field (54), Title, in column 1, line 1, delete "AND" and insert -- AN --, therefor.

In column 1, line 1, delete "AND" and insert -- AN --, therefor.

Signed and Sealed this

Thirteenth Day of September, 2011

David J. Kappos
*Director of the United States Patent and Trademark Office*